United States Patent
Aaron

(10) Patent No.: US 8,116,792 B2
(45) Date of Patent: Feb. 14, 2012

(54) METHODS, SYSTEMS, AND COMPUTER-READABLE MEDIA FOR MITIGATING A TEMPORARY INTERFERENCE CONDITION

(75) Inventor: Jeffrey A. Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 679 days.

(21) Appl. No.: 11/943,250

(22) Filed: Nov. 20, 2007

(65) Prior Publication Data

US 2009/0131067 A1   May 21, 2009

(51) Int. Cl.
*H04B 15/00* (2006.01)

(52) U.S. Cl. ...... 455/501; 455/63.1; 455/64; 455/67.11; 455/448; 455/452.1

(58) Field of Classification Search ........... 455/63.1–64, 455/67.11, 67.13, 448, 452.1–453, 456.1–456.6
See application file for complete search history.

(56) References Cited

U.S. PATENT DOCUMENTS

| | | | |
|---|---|---|---|
| 5,926,761 A * | 7/1999 | Reed et al. | 455/440 |
| 2007/0004336 A1* | 1/2007 | Aloni-Lavi et al. | 455/63.1 |
| 2007/0249402 A1* | 10/2007 | Dong et al. | 455/562.1 |
| 2008/0299932 A1* | 12/2008 | Belogolovy et al. | 455/296 |
| 2008/0311930 A1* | 12/2008 | Kalhan | 455/456.5 |

* cited by examiner

*Primary Examiner* — Fayyaz Alam
(74) *Attorney, Agent, or Firm* — Hope Baldauff Hartman, LLC

(57) ABSTRACT

Methods, systems, and computer-readable media for mitigating a temporary interference condition are provided. The temporary interference condition is predicted between a first cellular device and a second cellular device prior to an occurrence of the temporary interference condition. A mitigation action for mitigating the temporary interference condition is identified. A schedule and a scale or scaling for the mitigation action are determined. The mitigation action is implemented in accordance with the schedule and the scale or scaling to mitigate the temporary interference condition during the occurrence of the temporary interference condition.

9 Claims, 5 Drawing Sheets

METHODS, SYSTEMS, AND COMPUTER-READABLE MEDIA FOR MITIGATING A TEMPORARY INTERFERENCE CONDITION

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

One issue that commonly affects cellular customers is a temporary interference condition. Generally speaking, a temporary interference condition arises when two or more cellular devices are used within a close proximity for a short period of time, especially when one device is transmitting signals while another is receiving signals. A typical example may occur when two cellular customers walk past each other on a street while each cellular customer is utilizing a cellular device. Prior to and after the two cellular customers walk past each other, both cellular customers may experience a satisfactory QoS. However, during a time period when the two cellular customers are in close proximity, the radio frequency ("RF") signals transmitted to and from one cellular device may interfere with the RF signals transmitted to and from the other cellular device and/or the attempted reception of RF signals. This interference may be exacerbated if both respective cellular devices share the same cellular tower. Although only temporary, the effective result of the interfering RF signals can be a severe and unacceptable decrease in QoS.

SUMMARY

Embodiments of the disclosure presented herein include methods, systems, and computer-readable media for mitigating a temporary interference condition. According to one aspect, a method for mitigating a temporary interference condition is provided. According to the method, the temporary interference condition is predicted between a first cellular device and a second cellular device prior to an occurrence of the temporary interference condition. A mitigation action for mitigating the temporary interference condition is identified. A schedule and a scale or scaling for the mitigation action are determined. The mitigation action is implemented in accordance with the schedule and the scale or scaling to mitigate the temporary interference condition during the occurrence of the temporary interference condition.

According to another aspect, a system for mitigating a temporary interference condition is provided. The system includes a memory and a processor functionally coupled to the memory. The memory stores a program containing code for mitigating the temporary interference condition. The processor is responsive to computer-executable instructions contained in the program and operative to predict the temporary interference condition between a first cellular device and a second cellular device prior to an occurrence of the temporary interference condition, identify a mitigation action for mitigating the temporary interference condition, determine a schedule for the mitigation action, determine a scale or scaling for the mitigation action, and implement the mitigation action in accordance with the schedule and the scale or scaling to mitigate the temporary interference condition during the occurrence of the temporary interference condition.

According to yet another aspect, a computer-readable medium having instructions stored thereon for execution by a processor to perform a method for mitigating a temporary interference condition is provided. According to the method, the temporary interference condition is predicted between a first cellular device and a second cellular device prior to an occurrence of the temporary interference condition. A mitigation action for mitigating the temporary interference condition is identified. A schedule and a scale or scaling for the mitigation action are determined. The mitigation action is implemented in accordance with the schedule and the scale or scaling to mitigate the temporary interference condition.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1A:
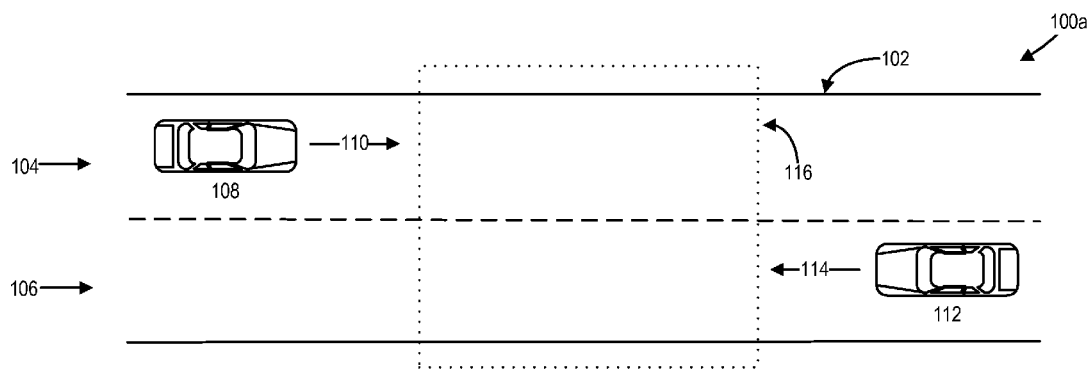
FIG. 1A is a high-level diagram illustrating an early portion of a sequence of time prior to an occurrence of a temporary interference condition, in accordance with exemplary embodiments.

The following detailed description is directed to methods, systems, and computer-readable media for mitigating a temporary interference condition. In the following detailed description, references are made to the accompanying drawings that form a part hereof, and which are shown by way of illustration through specific embodiments or examples.

As used herein, a temporary interference condition refers to a temporary decrease in quality of service ("QoS") caused by interfering radio frequency ("RF") signals transmitted to and from multiple cellular devices. The decrease in QoS may be temporary because cellular customers (and/or other users) operating the cellular devices often move. A basic example of a temporary interference condition involves two cellular devices. In a given sequence of time, the two cellular devices may begin the sequence located outside an interfering proximity (i.e., a distance or area within which RF signals transmitted to and from two or more cellular devices interfere). While the cellular devices are located outside the interfering proximity, the cellular devices may experience satisfactory QoS. However, as the two cellular devices move within the interfering proximity, the RF signals transmitted to and from one cellular device may adversely interfere with the RF signals transmitted to and from the other cellular device and/or the attempted reception of RF signals by either device.

Typically, the most severe interference will occur when one device is transmitting while another device is attempting to receive signals which are, for whatever reason, particularly important to QoS and/or satisfactory user quality of experience, as for example certain critical frames of a video communication. The transmission from the first device interferes with the attempted reception by the second device, especially when the received power of the transmission from the proximal first device is greater than that of the transmission the second device is attempting to receive, which has traveled much farther and therefore lost most of its power, and thus the transmission from the first device overwhelms the second device's receiver. When the cellular devices enter the interfering proximity, the cellular devices may experience a severe and unacceptable decrease in QoS. Later in the sequence of time, the cellular devices may leave the interfering proximity and again return to a satisfactory QoS.

Exemplary embodiments described herein may be utilized to mitigate the decrease in QoS experienced during the temporary interference condition. According to exemplary embodiments, the movement of cellular devices within a cellular network may be monitored to determine whether any temporary interference conditions may occur at some point in the future between two or more cellular devices. If it is predicted that a temporary interference condition is likely to occur, then a mitigation action for mitigating any negative effects to QoS resulting from the actual occurrence of the temporary interference condition is identified. The mitigation action may be implemented to mitigate the temporary interference condition in accordance with a predefined schedule (i.e., a start time and end time) and scale or scaling (i.e., one or more levels of implementation).

Figure 1B:
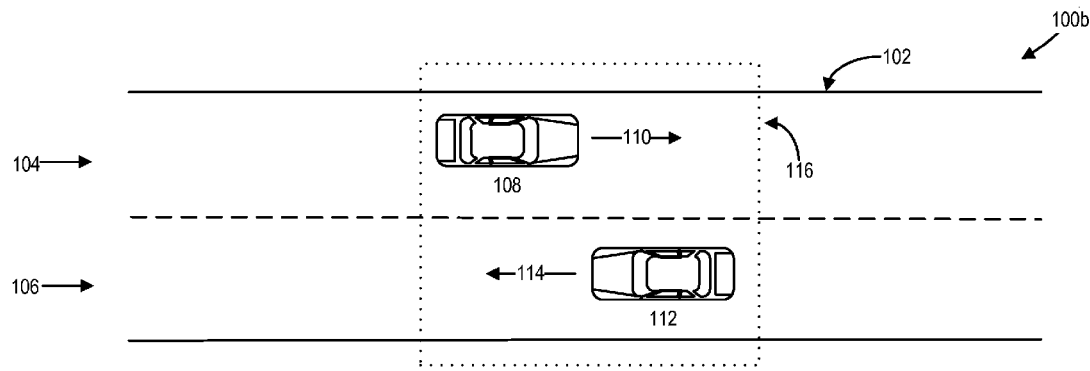
FIG. 1B is a high-level diagram illustrating a middle portion of the sequence of time during the occurrence of the temporary interference condition, in accordance with exemplary embodiments.
Figure 1C:
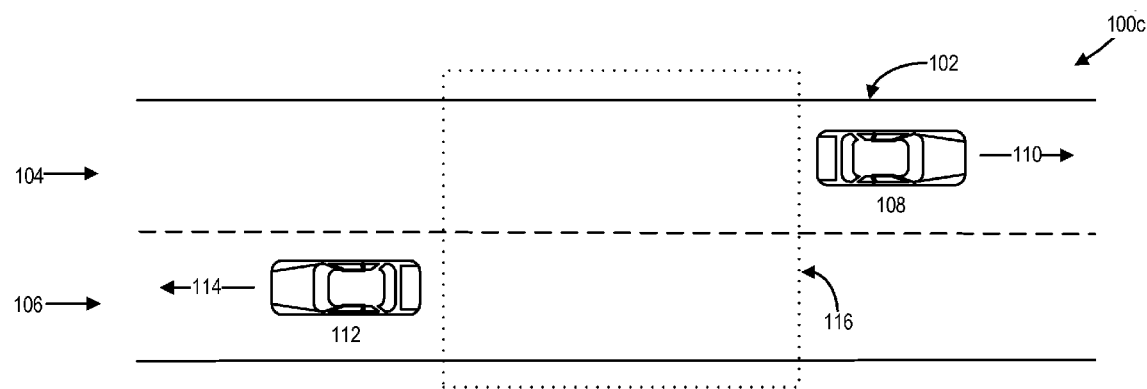
FIG. 1C is a high-level diagram illustrating a late portion of the sequence of time after the occurrence of the temporary interference condition, in accordance with exemplary embodiments.

Referring now to the drawings, it is to be understood that like numerals represent like elements through the several figures, and that not all components and/or steps described and illustrated with reference to the figures are required for all embodiments. FIGS. 1A, 1B, and 1C are simplified diagrams 100a, 100b, 100c illustrating various instances within a given sequence of time in which a temporary interference condition occurs. The sequence of time can be divided into three portions: an early portion, a middle portion, and a late portion. The middle portion occurs chronologically after the early portion, and the late portion occurs chronologically after the middle portion. The diagram 100a illustrates the early portion of the sequence of time, and the diagram 100b illustrates the middle portion of the sequence of time. The diagram 100c illustrates the late portion of the sequence of time.

Figure 2:
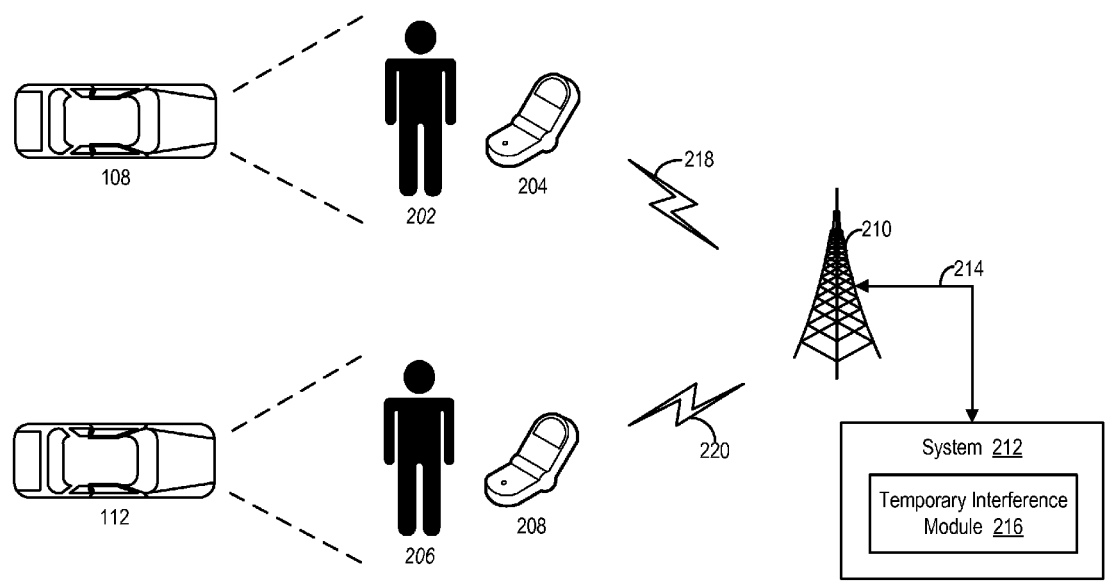
FIG. 2 is a high-level diagram illustrating a cellular network, in accordance with exemplary embodiments.

Turning now to FIG. 1A, an illustrative roadway 102 is shown during the early portion of the sequence of time. The illustrative roadway 102 includes a first lane 104 and a second lane 106. On the first lane 104 is a first vehicle 108 travelling towards a first direction 110. On the second lane 106 is a second vehicle 112 travelling towards a second direction 114. Turning now to FIG. 2, a more detailed representation of the first vehicle 108 and the second vehicle 112 is shown. In particular, inside the first vehicle 108 are a first user 202 and a first cellular device 204, and inside the second vehicle 112 are a second user 206 and a second cellular device 208. Exemplary cellular devices include a cellular phone, a smartphone, a personal digital assistant ("PDA"), and the like. The first cellular device 204 and the second cellular device 208 are configured to communicate via RF signals 218, 220 with one or more cellular towers, such as a cellular tower 210. The cellular tower 210 communicates with a computer system 212 via a backbone network 214. The computer system 212 may be configured to operate as a central controller that manages and provides cellular functionality (e.g., chat, text, Internet) to the first cellular device 204 and the second cellular device 208. As illustrated in FIG. 2, the computer system 212 includes a temporary interference module 216, which is configured to mitigate an anticipated temporary interference condition. It should be appreciated that any sort of transceiver or communicator can be substituted for the cellular tower, although applicability to the case involving cellular towers and base stations is especially illustrative. The operation of the temporary interference module 216 is described in greater detail below with respect to FIG. 4.

Referring again to FIG. 1A, an outline of an illustrative interfering proximity 116 is also shown. The interfering proximity 116 represents an approximate distance or area within which the RF signals 218, 220 transmitted to and from the first cellular device 204 and the second cellular device 208 may adversely interfere. For example, the interfering proximity 116 may typically range from a few meters to a kilometer, depending on many factors such as design features and parameters of the type of communication being used, hardware aspects such as base station and mobile transceiver designs, antenna gains and patterns and/or directionality, relative orientation of antennas, battery power available at the mobile device, types and levels of ambient noise and/or interference, terrain aspects such as degree of flatness versus hills or rocky outcrops, nearby obstacles such as buildings or vehicles or metal signs, and the like. Additionally, the degree of interference will increase as proximity increases, but this increase may be more in some cases than in others, due again to the factors mentioned above, such that multiple concentric interference proximities could also be considered where each smaller interference proximity corresponds to a greater amount of expected interference. Alternately or additionally, a smooth or gradual change in proximity versus expected interference could be considered, such as an algorithmic and/or graphical relationship. In the early portion illustrated in FIG. 1A, the first vehicle 108 and the second vehicle 112 are outside of the interfering proximity 116. As such, the RF signals 218, 220 transmitted to and from the first cellular device 204 and the second cellular device 208 do not interfere, and QoS may be satisfactory. However, it can be anticipated in FIG. 1A that the first vehicle 108, while travelling in the first direction 110, and the second vehicle 112, while travelling in the second direction 114, may likely converge into the interfering proximity 116, as illustrated in FIG. 1B.

Referring now to FIG. 1B, the illustrative roadway 102 is shown during the middle portion of the sequence of time. Compared with FIG. 1A, in FIG. 1B the first vehicle 108 has traveled further in the first direction 110, and second vehicle 112 has traveled further in the second direction 114. In particular, the first vehicle 108 and the second vehicle 112 are now positioned within the interfering proximity 116. As such, the RF signals 218, 220 transmitted to and from the first cellular device 204 and the second cellular device 208 may adversely interfere. In particular, the interfering RF signals 218, 220 may cause a severe and unacceptable decrease in QoS.

Referring now to FIG. 1C, the illustrative roadway 102 is shown during the late portion of the sequence of time. Compared to FIG. 1B, in FIG. 1C, the first vehicle 108 has traveled further in the first direction 110 and the second vehicle 112 has traveled further in the second direction 114. In particular, the first vehicle 108 and the second vehicle 112 are again outside the interfering proximity 116. As such, the RF signals 218, 220 transmitted to and from the first cellular device 204 and the second cellular device 208 do not interfere, and the QoS may revert back to a satisfactory level.

It should be appreciated that the roadway 102 illustrated in FIGS. 1A, 1B, and 1C is merely one example of an area where a temporary interference condition may occur. Further examples may include streets, buildings, and other suitable areas in which two or more cellular devices potentially converge within an interfering proximity, such as the interfering proximity 116. Again it should be appreciated that the area of the interfering proximity may vary, e.g., depending on obstructions, conditions, and the like. This variation may even occur as proximity changes during a temporary interference condition or event, such that in one embodiment, the interfering proximity may be re-calculated periodically and/or continuously for better accuracy. Alternately, re-calculation can be accomplished when triggered, for example, due to a significant change and/or a change of proximity, or some related parameter, exceeding a threshold.

Figure 3:
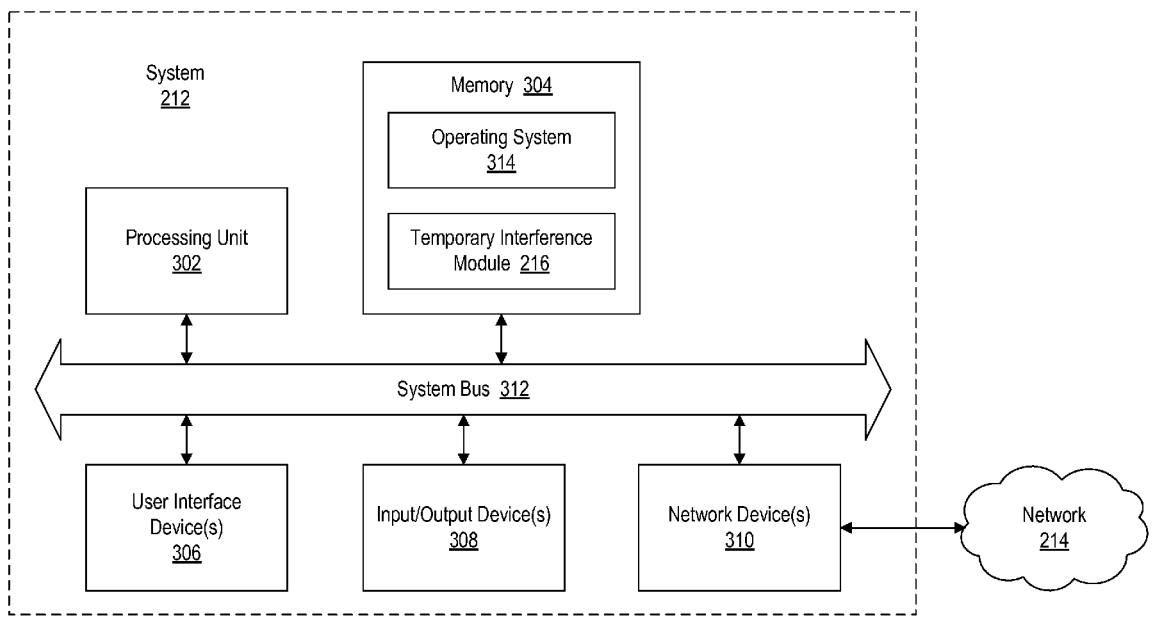
FIG. 3 is a block diagram illustrating the system configured to mitigate a temporary interference condition, in accordance with exemplary embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating the computer system 212 configured to mitigate a temporary interference condition, in accordance with exemplary embodiments. The computer system 212 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 314 and the temporary interference module 216, according to exemplary embodiments. Examples of operating systems, such as the operating system 314, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. In one embodiment, the temporary interference module 216 is embodied in computer-readable media containing instructions that, when executed by the processing unit 302, performs a method for mitigating a temporary interference condition, as described in greater detail below with respect to FIG. 4. According to further embodiments, the temporary interference module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 212.

The user interface devices 306 may include one or more devices with which a user accesses the computer system 212. The user interface devices 306 may include, but are not limited to, computers, servers, personal digital assistants, cellular phones, or any suitable computing devices. The I/O devices 308 enable a user to interface with the temporary interference module 216. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 212 to communicate with other networks or remote systems via a network, such as the backbone network 214. Examples of the network devices 310 may include, but are not limited to, a modem, a radio frequency ("RF") or infrared ("IR") transceiver, a telephonic interface, a bridge, a router, or a network card. The backbone network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the backbone network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
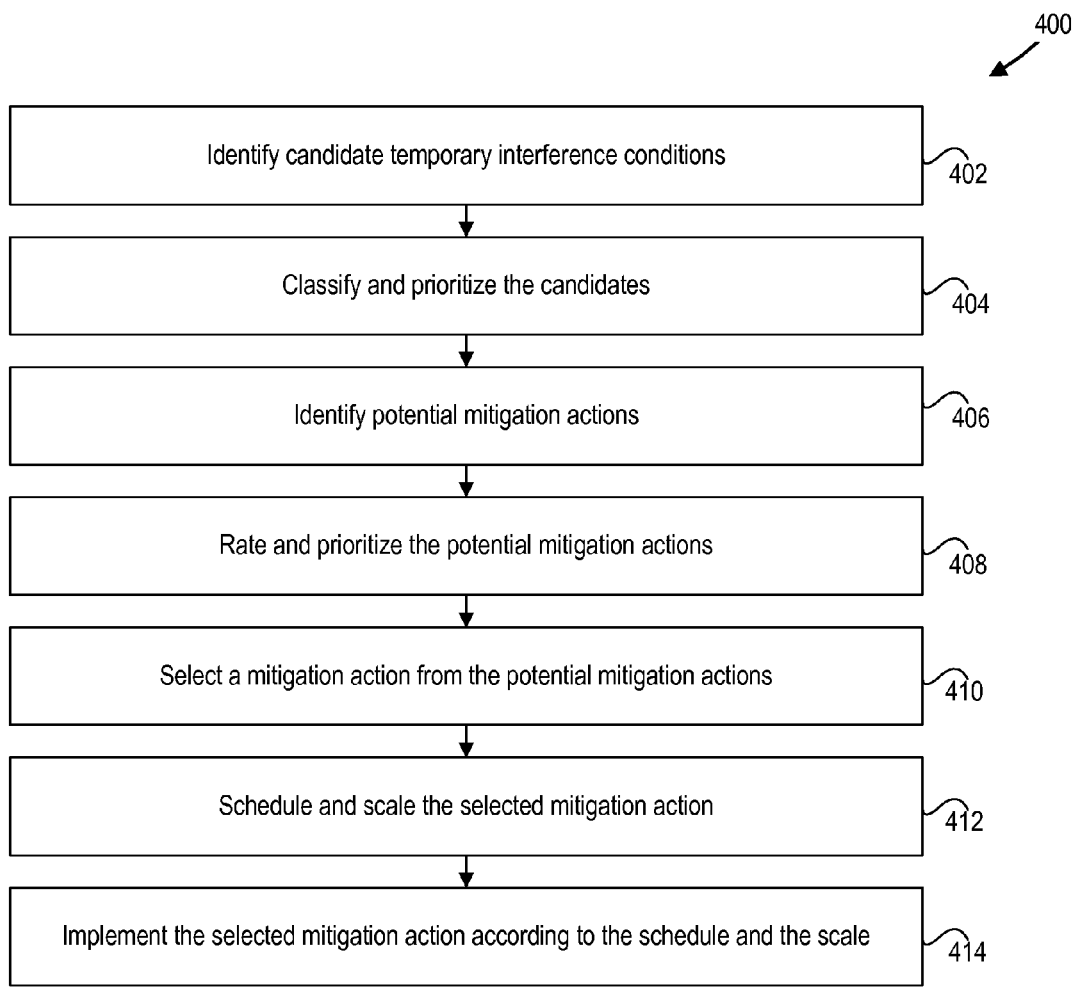
FIG. 4 is a flow diagram illustrating a method for mitigating a temporary interference condition, in accordance with exemplary embodiments.

FIG. 4 is a flow diagram illustrating a method 400 for mitigating a temporary interference condition, in accordance with exemplary embodiments. According to the method 400, the temporary interference module 216 identifies (at 402) a number of candidate temporary interference conditions and their associated cellular devices. For example, as one of the candidate temporary interference conditions, the temporary interference module 216 may identify the first cellular device 204 and the second cellular device 208 travelling in the first vehicle 108 and the second vehicle 112, respectively. In particular, the temporary interference module 216 may predict that the first vehicle 108 and the second vehicle 112 will converge within the interfering proximity 116 at some point in the future, thereby causing a potential temporary interference condition. The interfering proximity 116 may be calculated at operation 402 or at another operation as contemplated by those skilled in the art.

In one embodiment, the temporary interference module 216 identifies candidate temporary interference conditions by predicting whether two or more cellular devices, such as the cellular devices 204, 208, will converge within an interfering proximity, such as the interfering proximity 116, at some point in the future based on movement data. As previously mentioned, the interfering proximity 116 is a distance or area within which RF signals transmitted to and from one cellular device interfere with RF signals transmitted to and from other cellular devices, according to exemplary embodiments. As used herein, the movement data refers to any suitable data associated with the movement of the cellular devices 204, 208. Movement data may include, but is not limited to, the location, speed, and direction of movement of the cellular devices 204, 208. The movement data may include current data as well as historical data tracking past movements. In particular, the past movements may be utilized in conjunction with the current data in order to predict future movements.

The movement data and interfering proximity may be determined utilizing any suitable methods as contemplated by those skilled in the art. In one embodiment, the temporary interference module 216 utilizes geographic data retrieved from a Geographic Information System ("GIS"), Location Based Service ("LBS"), or other suitable system. Geographic data may include, but is not limited to, map data, road data, traffic data, building layouts, and the like. In a further embodiment, the temporary interference module 216 may utilize location data retrieved from a Global Positioning System ("GPS") or other suitable system. In this case, the cellular devices 204, 208 may each include a GPS receiver, for example. Interference proximity may be determined using various algorithms and methods well-known in the art, such as free space loss formulas, antenna pattern gains for various antenna orientations, and tables of expected power loss due to obstructions, different types of terrain, rain conditions, and the like. Refinement of interfering proximity due to hardware parameters and other implementation aspects may likewise be accomplished using well-known engineering calculations, simulation methods, adjustments based on test results, and the like.

Upon identifying the candidate temporary interference conditions, the temporary interference module 216 classifies and prioritizes (at 404) the candidate temporary interference conditions. In one embodiment, the candidate temporary interference conditions are classified according to a likelihood occurrence determination and a severity of impact determination. As used herein, the likelihood of occurrence determination refers to a likelihood that a candidate temporary interference condition will occur. Among other factors, the likelihood of occurrence determination may be based on a distance between the cellular devices 204, 208, a rate of convergence between the cellular devices 204, 208, a speed in which the cellular devices 204, 208 are moving, and a variance of direction (e.g., angle) of the cellular devices 204, 208. As used herein, the severity of impact determination refers to a level in which QoS of the cellular devices 204, 208 is affected as a result of the candidate temporary interference condition actually occurring. The severity of impact determination may be specific to each of the cellular devices 204, 208 depending on the QoS sensitivity of the cellular devices 204, 208 and the type and particular applications and/or services being used. For example, a business user utilizing a cellular device for a business meeting may be more sensitive to QoS than a non-business user utilizing a cellular device for recreational purposes. Among other factors, the severity of impact determination may be based on a number of cellular devices and users involved in the candidate temporary interference condition as well as ambient conditions associated with the cellular network. Ambient conditions may include a degree of volatility or change in noise levels and other QoS-related factors such as delay, latency, jitter, and data loss, where increased volatility may result in an increasingly fragile situation such that the range of anticipated quality widens, making it increasingly difficult to ensure satisfactory QoS.

In one embodiment, the temporary interference module 216 prioritizes the candidate temporary interference conditions according to the likelihood of occurrence determination and the severity of impact determination. For example, the candidate temporary interference conditions with a higher likelihood of occurrence and a higher severity of impact may be given higher priority than the candidate temporary interference conditions with a lower likelihood of occurrence and a lower severity of impact. By prioritizing the candidate temporary interference conditions in this manner, mitigation actions, which are described in greater detail below, taken to mitigate the negative impact of the candidate temporary interference conditions may be efficiently focused to achieve or maintain a desired QoS.

Upon classifying and prioritizing the candidate temporary interference conditions, the temporary interference module 216 identifies (at 406) potential mitigation actions for mitigating any negative effects resulting from the occurrence of one or more of the candidate temporary interference conditions. As previously mentioned, the mitigation actions may be focused on mitigating the effects of candidate temporary interference conditions with a higher priority, such as those temporary interference conditions with a higher likelihood of occurrence and higher severity of impact. The mitigation actions may include, but are not limited to, handoffs, resource (e.g., bandwidth, codes, frequencies, channels, time slots, and priorities) reallocation, application control actions, service control actions, and combinations thereof. Application control actions may include, but are not limited to, parameter re-adjustment, mode changes, temporary delays of actions, switching to alternate actions, and the like. Service control actions may include, but are not limited to, selecting alternate servers, alternate communication paths, changing service parameters and/or modes of operation, temporary delays of actions, alternate actions, etc.

According to exemplary embodiments, the mitigation actions may be determined based on predefined rules, algorithms and/or calculations, heuristic techniques, combinatorial techniques, and the like. In particular, mitigation actions may be identified in response to predefined trigger conditions. In a first example, a given mitigation action may be identified in response to a specific time. In a second example, a given mitigation action may be identified in response to a communication (e.g., a handshake) between the cellular devices 204, 208. In a third example, a given mitigation action may be identified in response to certain predicted paths of the cellular devices 204, 208. In a fourth example, a given mitigation action may be identified in response to certain applications and/or services performed by the cellular devices 204, 208. Other trigger conditions may be utilized as contemplated by those skilled in the art. Further, the trigger conditions may be weighted and/or utilized in a given sequence.

Upon identifying potential mitigation actions, the temporary interference module 216 rates and prioritizes (at 408) the potential mitigation actions. In one embodiment, the potential mitigation actions are rated in accordance with a probability that a given mitigation action will provide a desired effect mitigating a given temporary interference condition. For example, the probability may be determined based on an estimated effectiveness or a past effectiveness of the given mitigation action on the given temporary interference condition. The potential mitigation actions may be prioritized according to the rating associated with the potential mitigation actions. For example, potential mitigation actions with a higher rating (e.g., a higher probability of success in mitigating) may have a higher priority than potential mitigation actions with a lower rating (e.g., a lower probability of success in mitigating). Upon rating and prioritizing the potential mitigation actions, the temporary interference module 216 selects (at 410) one or more mitigation actions from the potential mitigation actions. In one embodiment, the temporary interference module 216 selects one mitigation action with the highest priority (e.g. the highest probability of success in mitigating) from the potential mitigation actions.

The temporary interference module 216 schedules and scale or scalings (at 412) the selected mitigation actions. As used herein, scheduling the selected mitigation actions refers to establishing a start time and an end time for each of the selected mitigation actions. As used herein, scaling the selected mitigation actions refers to establishing one or more levels in which the selected mitigation actions are implemented. The levels may be adjusted at various instances between the start time and the end time established in the scheduling in accordance with the severity of impact, as previously described. In particular, the levels may be adjusted higher when greater decreases in QoS are anticipated from a temporary interference condition and adjusted lower when lesser decreases in QoS are anticipated from the temporary interference condition. In one embodiment, the levels may be scheduled to increase gradually during the beginning of the condition, remain at a constant level during the middle of the condition, and decrease gradually during the last phase of the condition. For instance, the level might be the number of allocated channels, which at the beginning are increased in small steps to compensate for the increasing interference and since proportionally more channels are needed when each channel is increasingly degraded due to interference. The level is then decreased in small steps as the inference lessens toward the end of the interference condition event. According to exemplary embodiments, the selected mitigation actions are scheduled and scale or scaling in a manner sufficient to successfully mitigate any negative effects from the temporary interference condition.

Upon scheduling and scaling the selected mitigation actions, the temporary interference module 216 implements (at 414) the selected mitigation actions in accordance with the scheduling and scaling. In one embodiment, the selected mitigation actions are implemented by communicating the scheduling, scaling, and other information related to the selected mitigation actions to the cellular devices 204, 208. In this way, the cellular devices 204, 208 can mitigate each temporary interference condition as it is predicted to occur. In further embodiments, the temporary interference module 216 may monitor the effectiveness of the implemented mitigation actions. In this way, the selection or implementation of the mitigation actions can be adjusted to provide optimal QoS. In some embodiments, the interfering proximity may be re-calculated as discussed previously, possibly causing a re-determination and re-prioritization of mitigating actions, in effect looping back to an earlier step in the process of FIG. 4 as may be appropriate.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for mitigating a temporary interference condition, comprising:
   predicting the temporary interference condition between a first mobile cellular device and a second mobile cellular device prior to an occurrence of the temporary interference condition, the temporary interference condition caused by movement of the first mobile cellular device and the second mobile cellular device within an interfering proximity;
   identifying a plurality of potential mitigation actions for mitigating the temporary interference condition;
   associating each of the plurality of potential mitigation actions with a rating defining a probability of success with each of the plurality of potential mitigation actions;
   selecting a mitigation action having a highest rating from the plurality of potential mitigation actions;
   determining an anticipated severity of the temporary interference condition;
   determining higher levels of the mitigation action at instances where the anticipated severity is greater;
   determining lower levels of the mitigation action at instances where the anticipated severity is lower;
   generating a schedule for the mitigation action, the schedule comprising a start time and an end time for implementation of the mitigation action, the schedule further comprising adjustments between the higher levels of the mitigation action and the lower levels of the mitigation action during the implementation of the mitigation action;
   transmitting the schedule to the first mobile cellular device and the second mobile cellular device; and
   transmitting an instruction to the first mobile cellular device and the second mobile cellular device instructing the first mobile cellular device and the second mobile cellular device to implement the mitigation action in accordance with the schedule.

2. The method of claim 1, wherein predicting the temporary interference condition between a first mobile cellular device and a second mobile cellular device prior to an occurrence of the temporary interference condition comprises:

identifying first movement data associated with the first mobile cellular device, the first movement data comprising location, speed, and direction of movement of the first mobile cellular device;

identifying second movement data associated with the second mobile cellular device, the second movement data comprising location, speed, and direction of movement of the second mobile cellular device; and predicting the occurrence of the temporary interference condition if the first mobile cellular device and the second mobile cellular device converge within the interfering proximity based on the first movement data and the second movement data, wherein the interfering proximity indicates an area within which a first radio frequency signal transmitted to and from the first mobile cellular device interferes with a second radio frequency signal transmitted to and from the second mobile cellular device and interferes with attempted reception of a radio frequency signal.

3. The method of claim 1, wherein the plurality of potential mitigation actions comprise a handoff, a bandwidth reallocation, an application control action, and a service control action.

4. A system for mitigating a temporary interference condition, comprising:
a memory for storing a program containing code for mitigating the temporary interference condition;
a processor functionally coupled to the memory, the processor being responsive to computer-executable instructions contained in the program and operative to at least:
predict the temporary interference condition between a first mobile cellular device and a second mobile cellular device prior to an occurrence of the temporary interference condition, the temporary interference condition caused by movement of the first mobile cellular device and the second mobile cellular device within an interfering proximity,
identify a plurality of potential mitigation actions for mitigating the temporary interference condition,
associate each of the plurality of potential mitigation actions with a rating defining a probability of success with each of the plurality of potential mitigation actions,
select a mitigation action having a highest rating from the plurality of potential mitigation actions,
determine an anticipated severity of the temporary interference condition,
determine higher levels of the mitigation action at instances where the anticipated severity is greater,
determine lower levels of the mitigation action at instances where the anticipated severity is lower,
generate a schedule for the mitigation action, the schedule comprising a start time and an end time for implementation of the mitigation action, the schedule further comprising adjustments between the higher levels of the mitigation action and the lower levels of the mitigation action during the implementation of the mitigation action;
transmit the schedule to the first mobile cellular device and the second mobile cellular device; and
transmit an instruction to the first mobile cellular device and the second mobile cellular device instructing the first mobile cellular device and the second mobile cellular device to implement the mitigation action in accordance with the schedule.

5. The system of claim 4, wherein to predict the temporary interference condition between a first mobile cellular device and a second mobile cellular device prior to an occurrence of the temporary interference condition, the processor is further operative to at least:
identify first movement data associated with the first mobile cellular device, the first movement data comprising location, speed, and direction of movement of the first mobile cellular device,
identify second movement data associated with the second mobile cellular device, the second movement data comprising location, speed, and direction of movement of the second mobile cellular device, and
predict the occurrence of the temporary interference condition if the first mobile cellular device and the second mobile cellular device converge within the interfering proximity based on the first movement data and the second movement data,
wherein the interfering proximity indicates an area within which a first radio frequency signal transmitted to and from the first mobile cellular device interferes with a second radio frequency signal transmitted to and from the second mobile cellular device and interferes with attempted reception of a radio frequency signal.

6. The system of claim 4, wherein the plurality of potential mitigation actions comprise a handoff, a bandwidth reallocation, an application control action, and a service control action.

7. A computer-readable storage medium having instructions stored thereon for execution by a processor to provide a method for mitigating a temporary interference condition, the method comprising:
predicting the temporary interference condition between a first mobile cellular device and a second mobile cellular device prior to an occurrence of the temporary interference condition, the temporary interference condition caused by movement of the first mobile cellular device and the second mobile cellular device within an interfering proximity;
identifying a plurality of potential mitigation actions for mitigating the temporary interference condition;
associating each of the plurality of potential mitigation actions with a rating defining a probability of success with each of the plurality of potential mitigation actions;
selecting a mitigation action having a highest rating from the plurality of potential mitigation actions;
determining an anticipated severity of the temporary interference condition;
determining higher levels of the mitigation action at instances where the anticipated severity is greater;
determining lower levels of the mitigation action at instances where the anticipated severity is lower;
generating a schedule for the mitigation action, the schedule comprising a start time and an end time for implementation of the mitigation action, the schedule further comprising adjustments between the higher levels of the mitigation action and the lower levels of the mitigation action during the implementation of the mitigation action;
transmitting the schedule to the first mobile cellular device and the second mobile cellular device; and
transmitting an instruction to the first mobile cellular device and the second mobile cellular device instructing the first mobile cellular device and the second mobile cellular device to implement the mitigation action in accordance with the schedule.

8. The computer-readable storage medium of claim 7, wherein predicting the temporary interference condition between a first mobile cellular device and a second mobile cellular device prior to an occurrence of the temporary interference condition comprises:
  identifying first movement data associated with the first mobile cellular device, the first movement data comprising location, speed, and direction of movement of the first mobile cellular device;
  identifying second movement data associated with the second mobile cellular device, the second movement data comprising location, speed, and direction of movement of the second mobile cellular device; and
  predicting the occurrence of the temporary interference condition if the first mobile cellular device and the second mobile cellular device converge within the interfering proximity based on the first movement data and the second movement data,
  wherein the interfering proximity indicates an area within which a first radio frequency radio frequency signal transmitted to and from the first mobile cellular device interferes with a second radio frequency signal transmitted to and from the second mobile cellular device and interferes with attempted reception of a radio frequency signal.

9. The computer-readable storage medium of claim 7, wherein the plurality of potential mitigation actions comprise a handoff, a resource reallocation, an application control action, and a service control action.

* * * * *